United States Patent [19]

Krolopp et al.

[11] Patent Number: 4,472,606
[45] Date of Patent: Sep. 18, 1984

[54] MOBILE RADIO-TELEPHONE HANDSET AND HOLDER

[75] Inventors: Rudolph W. Krolopp, Palatine, Ill.; George J. Selinko, Lighthouse Point, Fla.

[73] Assignee: Motorola Inc., Schaumburg, Ill.

[21] Appl. No.: 400,797

[22] Filed: Jul. 22, 1982

[51] Int. Cl.³ .............................................. H04M 1/02
[52] U.S. Cl. ................................ 179/146 R; 179/178; 248/221.3; 248/223.4
[58] Field of Search ............... 179/146 R, 147, 100 C, 179/178; 455/90; D14/53; 248/221.3, 233.4; 312/7 R

[56] References Cited

U.S. PATENT DOCUMENTS

| D. 158,060 | 4/1950 | Flatter et al. | D26/14 |
|---|---|---|---|
| 2,193,536 | 3/1940 | Murdoch, Jr. | 179/146 R |
| 3,005,061 | 10/1961 | Cagen | 179/146 R |
| 3,150,239 | 9/1964 | Fielder | 179/146 R |
| 3,370,236 | 2/1968 | Walker | 455/89 |
| 3,538,267 | 11/1970 | Ross | 179/146 R |
| 4,088,848 | 5/1978 | Weed | 179/146 R |
| 4,142,312 | 3/1979 | Stokes | 40/336 |
| 4,145,583 | 11/1979 | Oshgan et al. | 179/146 R |
| 4,169,218 | 9/1979 | Tyler | 179/100 R |
| 4,299,344 | 11/1981 | Yamashita | 455/351 |
| 4,325,142 | 5/1982 | Nakazawa | 455/346 |

*Primary Examiner*—Gene Z. Rubinson
*Assistant Examiner*—Danita R. Byrd

*Attorney, Agent, or Firm*—Rolland R. Hackbart; James W. Gillman; Edward M. Roney

[57] ABSTRACT

This invention relates to a holder and mounting arrangement which can be mounted at any angle to various surfaces, for use with a radio telephone handset. Operation of the holder will permit insertion or removal of the handset from either end. The geometry of the retainer member allows pivoting action of either pair of spring washer set which enables the user to lift either the front or rear edge of the handset to clear the recess and slide it free of the guiderails for operation. The assembly is adaptable to various mounting surfaces within the passenger compartment of any vehicle. During operation, the grooved handset is inserted between the top rails of the retainer member and pushed along the guiderails, which lifts the retainer member against the spring load of the captivated spring washers until the handset is seated in the associated central cavity of the base member. Lifting or depressing the free end of the handset allows it to be slid out of the rails as the resulting leading edge will clear the edges of the central cavity in the base member. The handset can similarly be inserted into the holder assembly by placing one groove of the handset to the corresponding guiderail until secured. The handset can be withdrawn by grasping the handset and levering upward which will cause the holder to open and allow the handset to be removed from the holder.

10 Claims, 3 Drawing Figures

MOBILE RADIO-TELEPHONE HANDSET AND HOLDER

BACKGROUND OF THE INVENTION

The present invention relates generally to holders for accommodating telephone handsets used with land mobile radios or radio car telephones and, in particular, to a holder with a floating base which will accommodate the insertion and removal of a radio telephone handset through a sliding interlocking joint, the holder capable of being mounted to any surface.

Generally the prior art does not provide for the adequate retention of a radio telephone handset in a holder apparatus due to the various and continual vibrations which frequently occur as a result of the normal operation of the vehicle in which the radio telephone communication unit has been installed.

Similarly, the prior art does not provide a holder for a radio telephone handset which can be mounted to a multiplicity of surfaces within a user environment which dictates the need for versatile mounting approaches, while at the same time providing a holder which will adequately, yet simply, facilitate the securing of the handset when not in use by the operator. The approaches of the prior art are cumbersome in operation and require more physical space to facilitate mounting than is generally available within the user environment.

The known devices provide only for a one-way insertion of the mobile telephone handset and generally maintain the handset in a secure position by using spring-loaded clips or similar spring devices, which provide the holding force to the handset. Over time these parts quickly wear out and require replacement. Additionally, the prior art mounting arrangements, when attached to the available surface, generally work only in a vertical position.

The common disadvantage relating to all of the foregoing devices involves the relatively high cost, mounting complexity, and poor performance of the various types of apparatus which are utilized to secure a radio telephone handset once it is inserted in a holder apparatus in a manner consistent with the requirements of the operator.

SUMMARY OF THE INVENTION

It is, therefore, an object of the present invention to provide an improved handset holder assembly with a floating base which is used with a radio telephone handset and which will permit the mounting and retention of the handset once inserted into the holder assembly.

It is another object of the present invention to provide a handset and holder which will use an associated handset with a pair of longitudinal parallel grooves in opposing edges to constitute the basis of an interlocking sliding joint when the handset has engaged the holder assembly, the grooves also being a decorative and symmetrical feature of the radio telephone handset.

Still another object of the invention is to provide a holder with a U-shaped base having two guiderails on opposing tips, the guiderails engaging the grooves of the handset, which allows the handset to be moved between the rails from either direction and facilitates the securing of the handset in the holder by allowing the operator to insert either end of the handset into the holder.

Yet another object of the present invention is to provide a holder having a floating base with a central recessed cavity that is shaped and sized to mate with the receiver end of the handset which will form a firm plug-and-socket joint when the receiver end of the handset rests in a secure position in the cavity of the base member, thereby leaving the handset, once secured, unaffected by vibration.

It is still another object of this invention to provide a holder having a base which forms a snap fit with a retainer such that initial engagement of the handset will enable the leading edge of the handset to act as a cam on the surface of the base when the handset is pushed along the guiderails, causing the floating base to be pushed down and away from said handset, thereby facilitating removal or placement of the handset in the holder.

It is yet another object of the present invention to provide a holder which will facilitate mounting on any surface at various angles and in limited areas.

It is yet another object of the invention to provide a handset holder which is of low cost and is readily and easily manufactured.

In practicing the invention, an improved handset and holder is provided for accommodating a handset with a transmitter end and a larger receiver end, the receiver end having longitudinal parallel grooves about its bottom edge which accommodate a pair of guiderails of an associated retainer, each end of the handset being connected together by a solid bridge member which is suitable for grasping and for performing as a lever during disengagement of the handset from the retainer of the holder. The retainer has a pair of guiderails disposed at its top opposing edges which protrude inwardly to secure the handset about its grooves, thereby forming a sliding interlocking joint when the handset is placed in the holder. A base with a recessed cavity capable of accommodating the receiver end of the handset forms a snap fit with the retainer. When the receiver end of the handset is placed in the cavity of the base, a solid-plug-and-socket joint is created between the base and the handset. A plurality of spacer members and spring members are positioned between the retainer member and the base member, which permits the base to float within the retainer. The holder assembly has a bottom base plate which will facilitate mounting to any surface, regardless of the mounting angle or the curvature of the surface to which the holder is mounted.

BRIEF DESCRIPTION OF THE DRAWINGS

The features of the present invention which are believed to be novel are set forth with particularity in the claims. The invention itself, however, together with further objects and advantages thereof, may be best understood by reference to the following description when taken in conjunction with the accompanying drawings, in which like reference numerals refer to like elements in the several figures, and in which:

DETAILED DESCRIPTION OF THE PREFERRED EMBODIMENT

Figure 1:
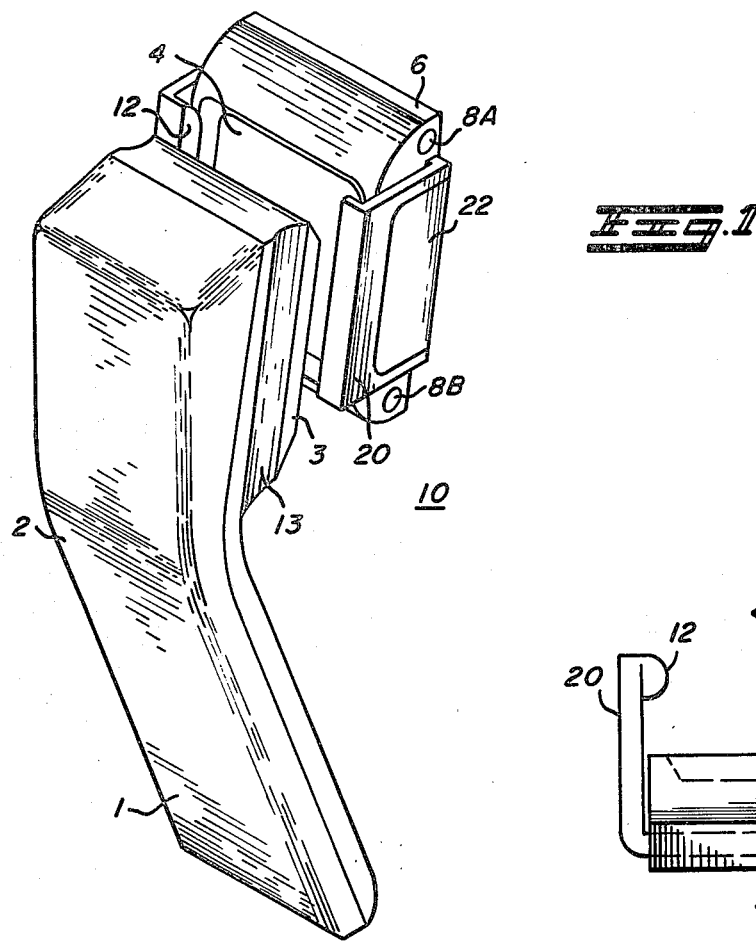
FIG. 1 is a view in perspective of the mobile radio telephone handset and holder which has been constructed in accordance with the present invention.
Figure 2:
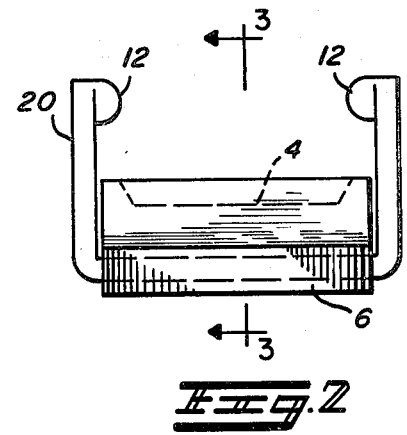
FIG. 2 is an enlarged top view of the handset holder of FIG. 1.
Figure 3:
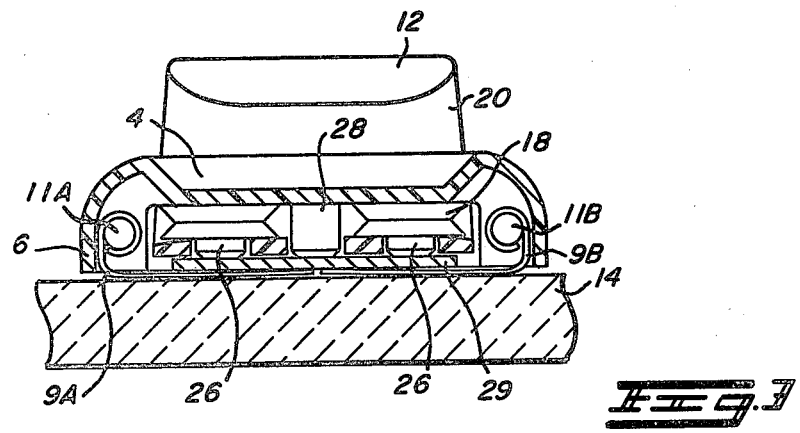
FIG. 3 is an enlarged cross-sectional view of the handset holder of FIG. 1, illustrating the recessed cavity and the floating base member, taken along lines 3—3 of FIG. 2, the holder mounted to a surface.

FIG. 1 is a view in perspective of a mobile radio telephone handset and holder. FIG. 2 is an enlarged front view of the holder, while FIG. 3 is an enlarged cross-sectional view of the holder illustrating the recessed cavity and the floating base member, taken along lines 3—3 of FIG. 2. Referring now to FIGS. 1, 2 and 3, the handset holder 10 is illustrated with an associated mobile radio telephone handset 2, said holder having been constructed in accordance with the present invention. The handset 2 has first and second ends, the first end being a receiver and the second being a transmitter. The holder 10 consists of a base member 6 which forms a snap fit with a U-shaped retainer member 20. The base member 6 has an associated central cavity 4 which is of a shape and depth to connect securely with the receiver end 3 of the associated handset 2 to form a plug-and-socket joint which facilitates an effective retention of the handset 2 when the handset 2 is in the holder 10. The U-shaped retainer member 20 has a pair of elongated guiderails 12 along each side of the U-shaped retainer member 20. The elongated guiderails 12 engage grooves 13 located on the edge of each side of the receiver end 3 of the associated handset 2, forming an interlocking sliding joint which facilitates movement of the handset 2 along the guiderails 12 into and out of the holder 10. Additionally this interlocking sliding joint enables the receiver end 3 of the handset 2 to interconnect quickly with the central cavity 4 of the base member 6, forming the plug-and-socket joint. The grooves 13, besides being functional, add a symmetrical and distinctive three-dimensional design to the associated handset 2. A metallic U-shaped bracket 22 may be placed over the base member 6 to provide extra support to the overall holder 10. Throughout the entire width of each end of the base member 6 there exists a single aperture 8a and 8b which facilitates the positioning of the roll pins 11a and 11b utilized in connecting the holder assembly 10 to a base plate for mounting purposes. The handset 2 has an elongated solid bridge member 1 suitable for grasping and performing as a lever during disengagement of the handset 2 from the U-shaped retainer member 20.

The elongated guiderails 12 run the entire length of the top portion of the U-shaped retainer member 20. The base member 6, with a central cavity 4, rests within the U-shaped retainer member 20 in such a manner as to allow the base member 6 to float freely within the U-shaped retainer member 20 through the use of compression springs 18 and spacer members 26 which are positioned between the U-shaped retainer member 20 and the base member 6. The compression springs 16 provide a continuous force which acts against the floating base member 6 and keeps the floating base member in firm contact with handset 2 whenever the handset is inserted in the U-shaped retainer member 20. If the handset 2 is removed from the U-shaped retainer, the U-shaped retainer allows the floating base member to travel within the retainer to the extent allowed by the compression springs 18. When the handset 2 is reinserted, the floating base member cooperates with the compression springs 18 to firmly engage the handset with the elongated guiderails 12. The base member 6 and U-shaped retainer member 20 are held together by a snap fit joint.

The enlarged partial cross-sectional view of the handset holder 10 in FIG. 3 along lines 3—3 of FIG. 2 illustrates the central recessed cavity 4 of said base member 6, said holder 10 being mounted to a surface 14. A plurality of compression springs 18 are positioned between the U-shaped retainer member 20 and the base member 6. The compression springs 18 may take the form of spring washers or the like common in the trade. An additional shim 29 may be present to provide a solid platform for the compression springs 18 to be placed upon.

The spring washers 18 position the base member 6 in a floating manner so that the insertion or removal of the handset 2 will require deflection of the base member 6 at either end, such deflection being a result of the handset 2 acting as a lever on the base member 6. Roll pins 11a and 11b, positioned within apertures 8a and 8b respectively, allows the holder to be affixed to base plate members 9a and 9b, which provide a flexible mounting arrangement suitable for flat or curved surfaces. The base plate members 9a and 9b are affixed to the surface 14 by conventional means inside the passenger compartment of the motor vehicle.

The base member 6 may contain a independent stop member 28 of any length, which is utilized in positioning the spring washers 18 and which prevents the deflection of the base member 6 beyond the stopping point. The handset holder 10 once mounted is operational for retaining and securing the handset 2 within the holder 10.

Thus, there has been provided, according to the invention, an improved and simple handset holder and mounting arrangement allowing the securing of a handset which is slid between the guiderails from either direction and with either end of the handset entering first. Although the foregoing has been a description and illustration of the specific embodiments of the invention, various modifications and improvements thereto can be made by persons skilled in the art within the scope or spirit of the invention and we intend in the following claims to cover all modifications which do not depart from the spirit and scope of this invention as defined by the following claims:

We claim:

1. A handset and holder assembly which comprises:
   a handset having first and second ends, said second end being substantially larger than said first end, said second end having integral longitudinal parallel grooves about an edge thereof, said first and second ends being coupled together by a solid bridge member suitable for grasping and wherein disengagement of the handset from an associated retainer member is achieved through lever action of said handset against said retainer member;
   the retainer member having a pair of guiderails disposed at opposing open terminal edges thereof, said guiderails protruding inwardly to secure the associated handset around said grooves by forming a sliding joint when said handset is so engaged;
   a base member with a recessed cavity, said cavity of a sufficient size and shape to accomodate the second end of said handset, said cavity and the second end of said handset forming a plug-and-socket joint when secured together and said base member being placed and of a sufficient shape and size to form a snap-fit assembly with said retainer member and said base member capable of deflecting at either end thereof when contacted by the associated handset;

a plurality of internal spacer members positioned between an inner surface of the retainer member and the opposing surface of said base member;

a plurality of spring members positioned between said internal spacer members and said base members; and means secured to said base member for mounting the holder assembly to a surface.

2. The handset and holder assembly of claim 1 wherein the second end of the associated handset has a means for camming against the surface of the base member as the handset is moved in either direction along said guiderails, said camming resulting in the base member being deflected down and away from said receiver end.

3. The handset and holder assembly of claim 1 wherein the guiderails of the retainer member are a pair of continuous guiderails which are open at each end to permit the handset to be inserted into the holder assembly by inserting either end of the second end of the handset from either direction regardless of the mounting position of the holder assembly.

4. A handset and holder assembly which comprises:

an associated handset with a transmitter end and a receiver end which is larger than the transmitter end, said receiver end having integral longitudinal parallel grooves about an edge thereof, each end being connected together by a solid bridge member suitable for grasping and performing as a lever during disengagement of the handset from an associated U-shaped retainer member;

the U-shaped retainer member having a pair of guiderails disposed at opposing top edges thereof, said guiderails protruding inwardly to secure the associated handset around said grooves by forming a sliding joint when said handset is so engaged;

a resilient U-shaped support bracket for overfitting said retainer member;

a rectangular base member with a central recessed cavity on a top surface, said cavity of a sufficient size and shape to accommodate the receiver end of said handset, said cavity and the receiver end of said handset forming a plug-and-socket joint when secured together and said base member being placed and of a predetermined shape and size to form a snap fit assembly with said U-shaped retainer member and having an aperture disposed throughout the width of each end and said base member capable of being deflected at a first or a second end thereof when contacted by the associated handset;

a plurality of internal spacer members positioned between an inner surface of the U-shaped retainer member and the opposing surface of said base member;

a plurality of spring members positioned between said internal spacer members and said base member; and means secured to said base member for mounting the holder assembly to a surface.

5. The handset and holder assembly of claim 4 wherein the receiver end of the associated handset has a leading edge which performs as a cam on the surface of the base member as the handset is moved in either direction along said guiderails, said cam resulting in the base member being deflected down and away from said receiver end.

6. The handset and holder assembly of claim 4 wherein the guiderails of the retainer member are a pair of continuous guiderails which are open at each end to permit the handset to be inserted into the holder assembly by inserting either end of the receiver end of the handset from either direction regardless of the mounting position of the holder assembly.

7. The handset and holder assembly of claim 4 wherein the means for mounting consists of a pair of cylindrical roll-pins of a predetermined size and length, said roll-pins being positioned within the respective apertures of said base member, and an associated base plate suitable for attachment to curved and flat surfaces, the base plate secured to the base member by the roll-pins.

8. A handset holder assembly which comprises:

a retainer member having a pair of guiderails disposed at opposing top edges thereof, said guiderails protruding inwardly to secure an associated handset having predetermined grooves by forming a sliding joint when said handset is so engaged;

a base member with a recessed cavity on a top surface, said cavity of a sufficient size and shape to accommodate the receiver end of said handset, said cavity and the receiver end of said handset forming a plug-and-socket joint when secured together and said base member being placed and of a predetermined shape and size to form a snap-fit assembly with said retainer member and said base member capable of deflecting at a first or a second end thereof when contacted by the associated handset;

a plurality of internal spacer members positioned between an inner surface of the retainer member and the opposing surface of said base member;

a plurality of spring members positioned between said internal spacer members and said base member; and means secured to said base member for mounting the holder assembly to a surface.

9. A handset holder assembly which comprises:

a U-shaped retainer member having a pair of guiderails disposed at opposing top edges thereof, said guiderails protruding inwardly to secure an associated handset about said grooves by forming a sliding joint when said handset is so engaged;

a resilient U-shaped support bracket overfitting said retainer member;

a rectangular base member with a central recessed cavity on a top surface, said cavity of a sufficient size and shape to accommodate the receiver end of said handset, said cavity and a receiver end of said handset forming a plug-and-socket joint when secured together, said base member being placed and of a predetermined shape and size to form a snap-fit assembly with said U-shaped retainer member and having an aperture disposed throughout the width of each end, said base member capable of deflecting at a first or a second end thereof when contacted by the associated handset;

a plurality of internal spacer members positioned between an inner surface of the U-shaped retainer member and the opposing surface of said base member;

a plurality of spring members positioned between said internal spacer members and said base member; and means secured to said base member for mounting the holder assembly to said surface.

10. The holder assembly of claim 9 wherein the means for mounting consists of a pair of cylindrical roll-pins of a predetermined size and length, said roll-pins being positioned within the respective apertures of said base member, and an associated base plate suitable for attachment to said surface, the base plate secured to the base member by the roll-pins.

* * * * *